United States Patent [19]

Eder

[11] 4,120,283
[45] Oct. 17, 1978

[54] SOLAR HEAT COLLECTOR

[75] Inventor: Anton Allen Eder, Moscow, Id.

[73] Assignee: Idaho Research Foundation, Inc., Moscow, Id.

[21] Appl. No.: 800,723

[22] Filed: May 26, 1977

Related U.S. Application Data

[63] Continuation-in-part of Ser. No. 678,126, Apr. 19, 1976, abandoned.

[51] Int. Cl.² .............................................. F24J 3/02
[52] U.S. Cl. ................................................... 126/270
[58] Field of Search ............... 126/270, 271; 237/1 A; 211/119.01; 135/5 R, 7.1 R, 7.1 A, 8

[56] References Cited

U.S. PATENT DOCUMENTS

| 3,875,925 | 4/1975 | Johnston | 126/270 |
| 3,980,071 | 9/1976 | Barber, Jr. | 126/271 |
| 4,019,496 | 4/1977 | Cummings | 126/271 |
| 4,062,346 | 12/1977 | Rapp, Jr. et al. | 126/270 |

Primary Examiner—Henry C. Yuen
Attorney, Agent, or Firm—Wells, St. John & Roberts

[57] ABSTRACT

A solar heat collector built about a new collector matrix formed from flexible sheet material, such as metallic foil. The matrix presented by the foil is folded into an accordion shape to form a series of linear channels to trap solar energy. The absorbed energy is transferred to air flowing through the channels. Proper support for the expended collector matrix is provided by taut lines stretched across a supporting frame and engaged with the folded flexible sheet. Inner and outer circulation channels are provided to permit air circulation by natural heating currents. The folded sheet and lines are constructed in kit form for expansion and support at the location of use. Transverse spacers might be included between pleats.

8 Claims, 6 Drawing Figures

SOLAR HEAT COLLECTOR

Related Application

This is a continuation-in-part of co-pending application Ser. No. 678,126, filed Apr. 19, 1976, now abandoned.

BACKGROUND OF THE INVENTION

This invention relates to an improvement in a solar heat collector. It is used for collecting heat from solar radiation and is designed for cost efficiency, as well as effective energy collection.

Prior solar heat collectors typically employ a black base surface, a glass cover spaced above the surface, and black tubing or pipes between the two, designed to carry liquid or fluid for heat transfer. Sometimes these devices are constructed with the fluid running between a sandwich comprising the glass cover and black base. Other existing solar heat collectors employ lenses or reflectors to concentrate the light and heat from the sun, but special lenses or reflectors are almost prohibitively expensive except for specialized heating purposes. While solar heating is becoming more important under present day circumstances, most heaters are somewhat ineffective and relatively expensive. The expense involved becomes even more important since most solar systems require a complete back-up system for use when solar energy is unavailable.

Examples of solar heat collectors are shown in the U.S. Patent to Thomason, U.S. Pat. No. 3,145,707, granted Aug. 125, 1964 and the Johnston U.S. Pat. No. 2,998,006, issued Aug. 29, 1961. These particular patents are of structural interest because they show corrugated solar heat collectors.

Flat plate solar collecting and storage systems have been proven effective for collecting solar energy, but have been marginally cost effective due to the high installation costs of the solar collectors and storage systems. The present cost of solar collectors is in excess of $6.00 per square foot, while economic cost calculations indicate that installed collectors must be priced at approximately $2.00 per square foot in order to be competitive with other energy installations. To meet this requirement the present invention utilizes a folded reflective foil collector matrix, which is relatively inexpensive in relation to prior collector structures of more substantial construction.

SUMMARY OF THE INVENTON

The collector matrix is located within a support frame and comprises a lightweight folded sheet of flexible material, such as metallic foil, capable of absorbing solar energy. The folded sheet is expanded accordion-style and spread across the framed enclosure to present a series of longitudinal pleats with alternate peaks and valleys facing toward the front of the matrix. A plurality of taut lines are stretched between opposed members of the frame. These lines are parallel to one another and located in a common plane within the framed enclosure. The folded sheet is supported by its engagement with the individual lines.

The above structure provides a low cost collector of relatively high efficiency. It requires no maintenance and is effective for air to air heat exchange systems. Solar heat collectors incorporating this matrix can be readily adapted to any existing or specially-designed building along wall or roof surfaces.

DESCRIPTION OF THE PREFERRED EMBODIMENTS

Figure 1:
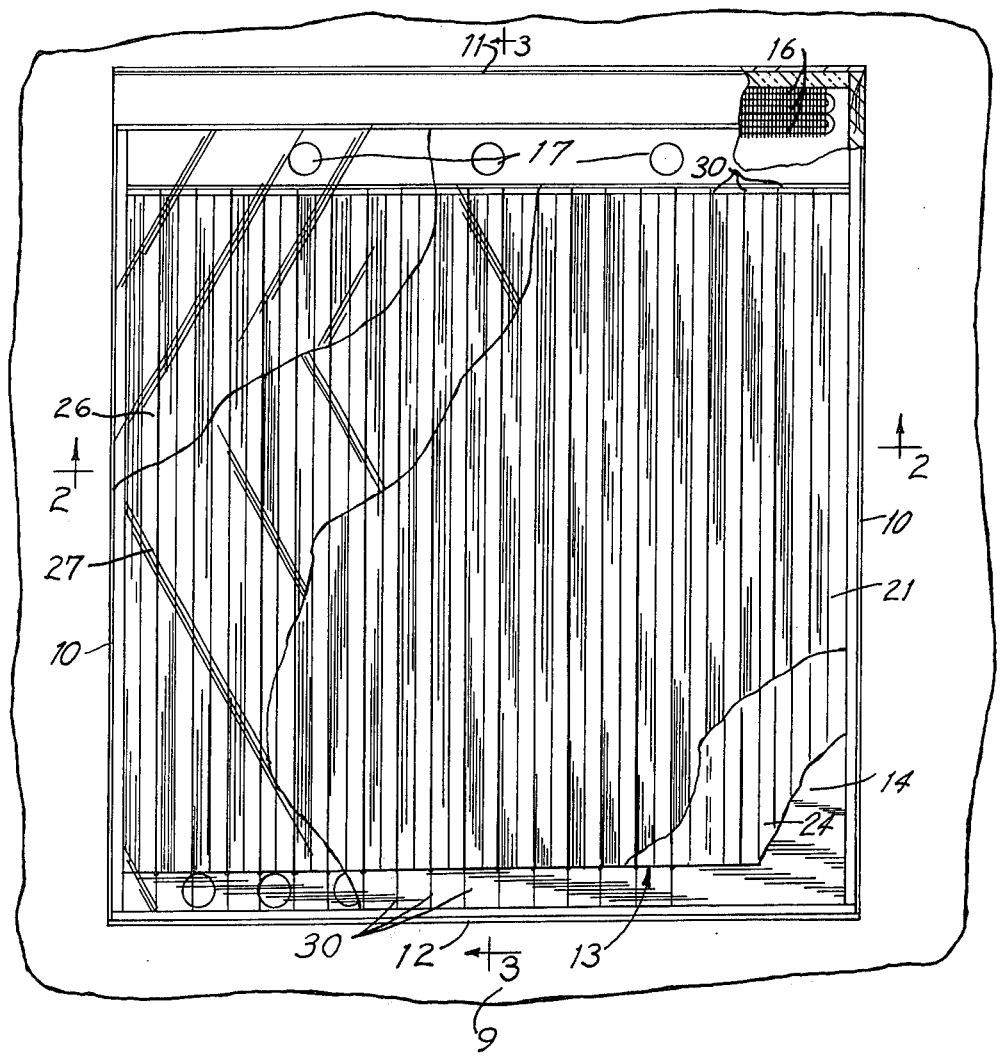
FIG. 1 is an elevation view looking toward a typical solar heat collector installed on a building surface, portions of the apparatus being broken away to illustrate internal structural features.
Figure 2:
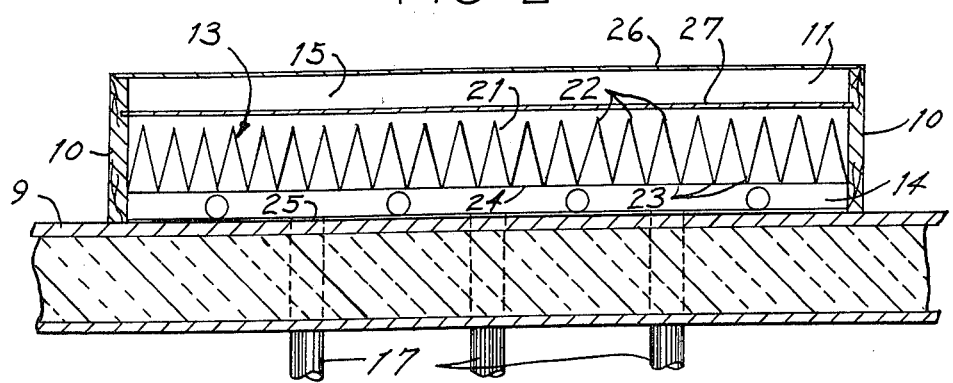
FIG. 2 is a cross-sectional view of the collector through a full section as seen along line 2—2 in FIG. 1.

Referring to the drawings, a first embodiment of the solar heat collector is illustrated in FIG. 1–4 as it would be mounted on a typical building structure. It is shown at the exterior of a roof surface 9. A number of collectors can be arranged as desired on the roof or walls of the building structure, or the collector can actually form one of the walls or roof areas of a building designed specifically for such utilization. The solar heat collector is enclosed within a peripheral frame including a pair of transversely spaced side members 10 and upper and lower end members 11, 12.

In describing the collector, the portions thereof which face outwardly from the building (toward the sun) will be referred to as being the front of the collector and the portions facing toward the building (away from the sun) will be referred to as the back of the collector. As seen in FIG. 1, the transverse dimensions across the view shall be refered to as the "width" of the collector and the upright or longitudinal dimensions shall be referred to as the "length". While the enclosed area within the frame members 10, 11, and 12 is illustrated as being rectangular, other geometric patterns or shapes can be utilized to match specific building structural requirements.

The front surfaces of the frame are covered by a double glaze cover comprising two sheets of glass 26, 27 spaced apart from one another to provide an air channel between them. Other suitable sheet materials can be substituted in place of glass, provided that they transmit solar energy and provide a suitable cover for the collector. A cover should be transparent to admit solar radiation. The air space between the sheets 26, 27 provides an insulating quality. A single layer cover can also be used when desired.

Rearward of the cover sheets 26, 27 is a collector matrix, which is described in detail below. A recirculating air channel 14 is formed between the back of the unit and the collector matrix 13. The channel between sheets 26, 27 may be used as an incoming air bleed channel, as indicated at 15. Incoming air is supplied through vents shown at 17, which extends through the roof structure 9 in open communication with the top portion of the incoming air bleed channel 15. The lower ends of channels 14 and 15 are in open communication with the upright channels formed along the collector matrix 13. Heated air flows through apertures in the upper end member 12 and flows through apertures in the upper end member 12 and flows around one or more pipes which are used as an air-water heat exchanger 16 to heat water for domestic purposes. Heated air is drawn back into the building structure through outlet vents at 18. It can be forced into the building by a fan (not shown) or can be moved solely by convective heat currents.

An alternative structure simply utilizes a trasnparent cover above matrix 13, a cool air duct across the lower matrix end, and a warm air duct across its upper end.

A cover valve structure illustrated at 28 serves to alternately direct the heated air to the outlet vents 18 or to the exterior at 28. The heated air would be directed exteriorly during the summer, when the unit will be used to draw air from the interior of the building to heat water in the heat exchanger 16, but the heated air itself is not desired.

The collector matrix 13 is formed of folded reflective metallic foil. An example is highly reflective or specular aluminum foil. A sheet 21 of the reflective material is folded into an accordion shape to form a series of linear channels or pleats which present parallel raised peaks 22 and depressed valleys 23 toward the front of the collector. Each channel between the adjacent peaks is an energy trap. Incident solar energy (direct and diffuse) reflects back and forth in the channel, losing small amounts of its energy to the channel wall on each bounce. The energy absorbed on the walls of the channel is transferred to air flowing through the collector matrix 13. A second sheet 24 of light reflective material, also preferably accordion folded foil, can span the valleys across the back of the collector matrix. This sheet 24 encloses the area bounded with each peak 22 to form parallel air channels for heat transfer purposes.

Figure 5:
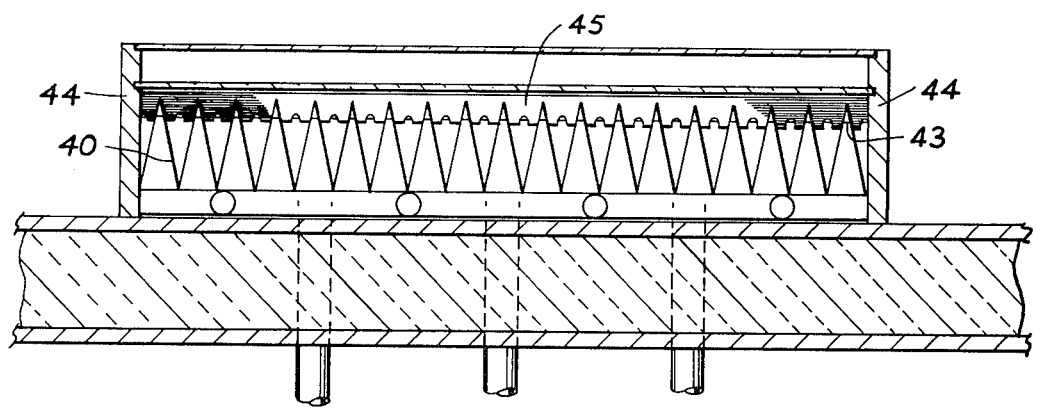
FIG. 5 is a cross-sectional view through another embodiment of the collector.
Figure 6:
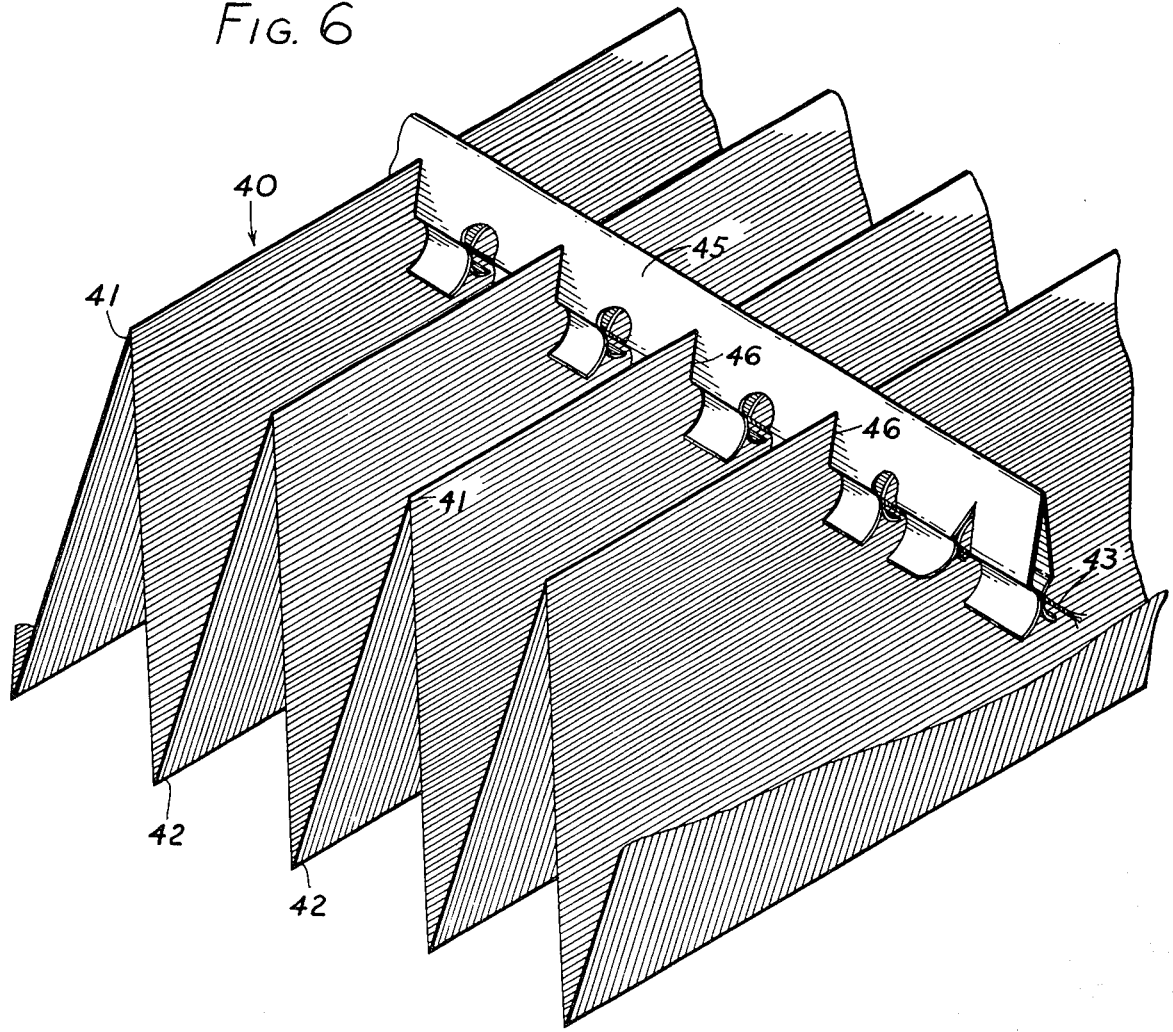
FIG. 6 is an enlarged fragmentary perspective view of the collector matrix in FIG. 5.

The folded foil structure comprising sheets 21, 24 can be readily manufactured with available techniques. The key problem in using a flexible lightweight sheet material as the structure for the collector matrix is the provision of proper support in the enclosed frame. This support is provided by running wire or other suitable lines under tension within or across each of the longitudinal peaks 22. Lines parallel to the peaks are shown in FIGS. 1–4; lines perpendicular to the peaks are illustrated in FIGS. 5 and 6. The folded sheet 21 can be engaged to the lines 30 by adhesive or mechanical means as desired. The taut lines 30 are parallel to one another and located within a common plane positioned in the area enclosed by the collector frame. The second sheet of material 24 can be secured to the frame members to provide additional support and alignment at the back of the collector matrix 13. The collector matrix can be shipped in a folded condition and expanded during installation of the unit.

The ratio of width to depth of the channels formed between the peaks 22 depends upon optimizing the cost with the entire collecting system. As the channel becomes increasingly narrow, its efficiency increases along with its cost. Specular aluminum foil has an absorptance in the range of 0.10 to 0.40 and therefore several reflections must occur to permit absorption of the majority of 0.02 to 0.10, and thus less long wave radiant energy is re-emitted. The ratio of short wave solar absorption to long wave energy emmittance depends upon the included angle of the foil matrix and will be adjusted to optimize solar collection at specific temperature ranges. The use of low cost aluminum foil to produce this energy trap and collector matrix is believed to be novel.

The recirculating air channel 14 can be completed by a reflective backing sheet 25, which also can be metallic foil. This sheet substantially prevents the transfer of heat energy to the supporting wall or roof structure of the building on which the unit is mounted.

Natural circulation through the collector matrix will occur at any time there is a temperature differential between the cold air at the bottom of the collector and the temperature within the collector matrix 13. Hot air within the matrix 13 will rise to provide such circulation. The collector structure shown by way of illustration in FIGS. 1 through 3 makes use of a triple flow concept to move cooling air through the collector matrix 13 and to further transfer collected energy to an air-water heat exchanger shown at 16.

Figure 3:
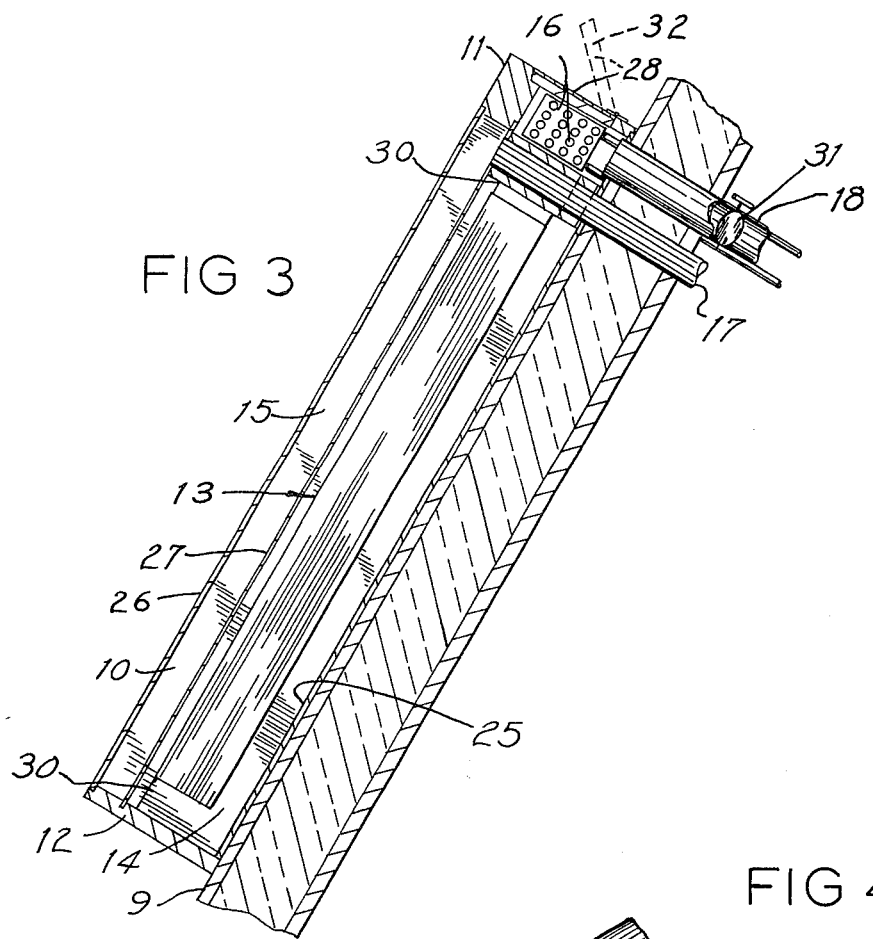
FIG. 3 is a vertical sectional view taken through a full section as seen along 3—3 in FIG. 1.
Figure 4:
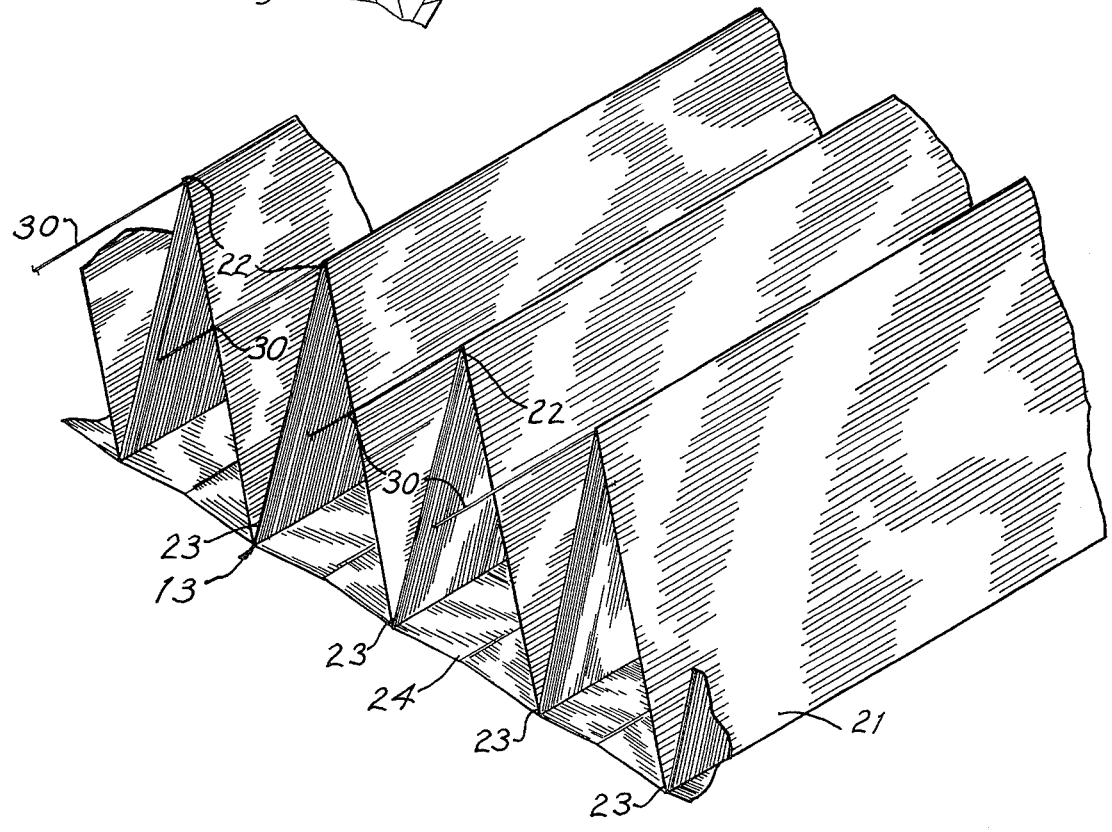
FIG. 4 is a fragmentary perspective view illustrating the structure of the collector matrix alone.

As can be seen in FIG. 3, hot air from the collector matrix 13 will move upwardly through the channels within the respective peaks 22. As it moves upwardly through the collector matrix 13, this air is heated and is ultimately discharged at the top of the matrix 13. It flows to the insulated chamber containing the air-water heat exchanger 16, where a portion of the heat in the air is transferred to the cooler water flowing through the air-water heat exchanger 16. As the air cools, a portion of it starts to sink down the recirculation chamber 14 behind the collector matrix 13 to return to the bottom of the central collector matrix 13.

The foil backing sheet 25 on the collector matrix 13 partially limits heat transfer directly from the matrix 13 to the recirculated air and allows natural circulation to be maintained. The back of the recirculation channel 14 is heavily insulated to limit losses from the unit. On low solar collection days, both valves 31, 32 will be maintained in a closed condition to continue automatic recirculation of air. Recirculation will be continued until the temperature at the top of the collector matrix 13 reaches the temperature of the water in storage, which is heated by the heat exchanger 16. At that point, a pump (not shown) will be utilized to flow water through the heat exchanger 16 for collection of energy for storage purposes. The recirculation channel allows transfer of energy to storage on even poor solar collection days.

The third flow channel down the front of the double sheets of glass 26, 27 bleeds a small amount of air from the interior of the building into the collector to recover convection and radiation losses through the first cover of the collector. This bleed air discharges back into the room through a damper valve or control 31. The amount of bleed air can be controlled by adjustment of the damper 31, allowing as much as 100% of the collector output to be circuated back into the building through the outlet vent 18 if desired. A standard forced air system can be connected to the discharge at vent 18 to circulate hot air directly into the building.

During summer operation, the hot air at the top of the collector can be discharged directly outside through damper 32, allowing the collector to act as an air pump for removing hot air from the building. The collector matrix 13 can still be utilized to heat air for use in the air-water heat exchanger 16. The water so heated could supply heat to an absorption air conditioning plant to provide solar air conditioning cooling to inlet air being pumped by the solar collector.

The air-water heat exchanger would consist of conventional finned tube heat exchangers for transfer of the energy in the hot air at the top of collector matrix 13 to the water medium. The water can be subsequently utilized to transfer the energy to storage tanks, room heating radiators, hot domestic water tanks, auxiliary heating units, or an absorption air conditioner.

Forced circulation caan also be utilized in conjunction with the apparatus by using a high pressure fan (not shown) drawing air at the bottom of the recirculation channel 14. This air can be used for hot air storage or routed directly for building heating purposes.

For lower temperature solar collection, where long wave radiation is not critical, the collector matrix 13 can be painted flat black to improve absorption.

I have also discovered through testing that painting a small absorbing section along the front surface of each valley 23 significantly improves performance of the collector matrix, particularly when the pleats are spread apart by a wide spacing.

The above collector matrix requires substantial fabrication at the site where the complete collector structure is produced, whether at a factory location or at a construction site. The lines 30 must be individually stretched on the supporting frame and the folded collector matrix must then be strung out along them.

A second embodiment of the invention is illustrated in FIGS. 5 and 6. These figures illustrate a modified form of the collector matrix which can be readily prefabricated in a kit form for more simple installation in the complete collector assembly.

In the modified collector matrix, the same folded sheet construction is provided as above, the folded sheet being identified in the drawings by the reference numeral 40. It includes alternating peaks 41 and valleys 42 along adjacent pleats. The pleats are formed by folding the sheet 40 back and forth along parallel fold lines as previously discussed. The pleats present alternate peaks and valleys when the sheet 40 is subsequently expanded in a transverse direction.

The sheet 40 is structurally suspended by a wire or line 43 strung transversely through the adjacent peaks 41. The wire or line 43 can be threaded through small punctures or apertures formed in the sheet surfaces, or can alternately be secured to the adjacent peaks by adhesive or mechanical fasteners or clips (not shown). By threading the wire or line 43 as shown, the wire or line 43 can remain loosely received through the folded sheet 40 while in a compact folded condition for shipping purposes.

By providing two or more wires or lines 43 across each sheet 40, means is provided to readily suspend the sheet 40 in a supporting frame. As can be seen in FIG. 5, the collector matrix is readily assembled by stretching the wires or lines 43 to a taut condition across opposed members 44 in a supporting framework. The sheet 40 can then be spread across the framework and will remain suspended on the wires or lines 43. Since the sheet 40 will normally be arranged with the wires or lines 43 in horizontal orientations and with the sheet folds in upright orientations, and since the sheet 40 will normally be enclosed from the elements, it can be suspended only by the wires or lines 43 without any additional interconnecting devices or spacers. However, to assure equal spacing between adjacent peaks 41, a light spacing element as illustrated in FIGS. 5 and 6 is desirable. The spacer 45 is a bent metal clip which extends transversely across the collector matrix. Its rear edge has a series of V-shaped indentations 46 which are adapted to receive the adjacent peaks 41. The clip 45 presents a series of opposed prongs which yieldably engage the wire or line 43 to maintain the clip 45 in a fixed condition across the collector matrix as illustrated.

This second embodiment is particularly handy in producing a "do-it-yourself" kit for construction of a solar collector matrix. The folded sheet 40, wires or lines 43 and the spacers 45 can be shipped in an unassembled condition to the user, who can readily assemble and stretch the collector matrix on a frame constructed at the job site.

Various modifications can be made in the illustrated structure and therefore only the following claims are intended as definitions of the disclosed invention.

Having thus described my invention, I claim:

1. In a solar heat collector;
    a support frame having transverse width and longitudinal length, the front of the frame being adapted to be faced toward the sun and the back of the frame being adapted to be faced away from the sun;
    said frame being in the form of an enclosure having transversely spaced side members and longitudinally spaced end members enclosing an area of solar heat collection;
    a plurality of taut flexible support lines stretching between opposed members of the frame, lines being parallel to one another and located in a common plane within the enclosure;
    a folded sheet of lightweight flexible material capable of absorbing solar energy, such as a sheet of metallic foil;
    said folded sheet being expanded accordion style within the frame to form a series of pleats which present parallel raised peaks and depressed valleys facing toward the front of the frame;
    the folded sheet being suspended upon said lines for structural support of the sheet.

2. A solar heat collector as set out in claim 1 wherein the rear surfaces of the valleys of said folded sheet are spanned by light-reflective material arranged along a plane parallel to the plane within which the lines are located.

3. A solar heat collector as set out in claim 1 wherein the rear surfaces of the valleys of said folded sheet are spanned by an attached sheet of flexible light-reflective material also folded accordion-style, but arranged substantially flat when spread across the enclosure.

4. A solar heat collector as set out in claim 3 further comprising a backing layer of material extending across the length and width of the frame, the backing layer spanning the enclosure and being spaced rearwardly from the attached sheet of material, said backing layer having a light-reflective surface directed toward the front of the frame.

5. A solar heat collector as set out in claim 1 further comprising: spacer means oriented perpendicular to the pleats and in structural engagement with the individual peaks for maintaining a constant spacing between them.

6. A solar heat collector as set out in claim 1 wherein the lines are arranged perpendicular to the pleats.

7. A solar heat collector as set out in claim 1 wherein the individual peaks along the folded sheet are suspended upon said lines for structural support of the sheet.

8. A solar heat collector as set out in claim 1 further comprising:
    a first air circulation channel across the back of the folded sheet within the frame;
    a second air circulation channel across the front of the folded sheet within the frame;
    the first and second air circulation channels being in open communication with the areas between adjacent pleats in the folded sheet at the lower end of the frame.

* * * * *